United States Patent
Greenberg

(10) Patent No.: US 7,270,499 B2
(45) Date of Patent: Sep. 18, 2007

(54) SOIL AND/OR GROUNDWATER REMEDIATION PROCESS

(76) Inventor: Richard S. Greenberg, 3 Tall Oaks Ct., Mendham, NJ (US) 07945

( * ) Notice: Subject to any disclaimer, the term of this patent is extended or adjusted under 35 U.S.C. 154(b) by 285 days.

(21) Appl. No.: 10/791,521

(22) Filed: Mar. 2, 2004

(65) Prior Publication Data

US 2004/0165956 A1 Aug. 26, 2004

Related U.S. Application Data

(63) Continuation-in-part of application No. 09/062,838, filed on Apr. 20, 1998, now abandoned.

(51) Int. Cl.
*B09C 1/08* (2006.01)
*A62D 3/38* (2006.01)

(52) U.S. Cl. .............. 405/128.5; 405/128.75; 588/320; 588/405; 588/406

(58) Field of Classification Search ............. 405/128.5, 405/128.55, 128.75; 588/900, 320, 405–406; 423/272; 210/170, 747
See application file for complete search history.

(56) References Cited

U.S. PATENT DOCUMENTS

| | | | | |
|---|---|---|---|---|
| 5,130,053 A | * | 7/1992 | Feasey et al. | 252/400.22 |
| 5,232,484 A | * | 8/1993 | Pignatello | 558/206 |
| 5,259,962 A | * | 11/1993 | Later | 210/758 |
| 5,560,737 A | * | 10/1996 | Schuring et al. | 405/128.45 |
| 5,663,475 A | * | 9/1997 | Elgal | 210/750 |
| 5,741,427 A | * | 4/1998 | Watts et al. | 210/747 |
| 5,868,523 A | * | 2/1999 | Nickell et al. | 405/128.45 |
| 6,160,194 A | * | 12/2000 | Pignatello | 405/128.5 |
| 6,319,328 B1 | * | 11/2001 | Greenberg et al. | 134/2 |
| 6,403,034 B1 | * | 6/2002 | Nelson et al. | 422/32 |

OTHER PUBLICATIONS

Nelson, C.H. and Brown, R.A., "Adapting Ozonation for Soil and Groundwater Cleanup", Chemical Engineering, Nov. 1994, pp. EE-18-EE-22.*

* cited by examiner

*Primary Examiner*—Wayne A. Langel
*Assistant Examiner*—James Fiorito
(74) *Attorney, Agent, or Firm*—Watov & Kipnes P.C.

(57) ABSTRACT

A method of treating contaminants in soil and/or groundwater including adding a source of a peroxide and ozone to the in situ environment in amounts capable of producing reactive species sufficient to oxidize at least one of the contaminants without acidification of the environment.

18 Claims, No Drawings

SOIL AND/OR GROUNDWATER REMEDIATION PROCESS

RELATED APPLICATION

This is a continuation-in-part application of U.S. patent application Ser. No. 09/062,838 filed on Apr. 20, 1998 now abandoned.

FIELD OF THE INVENTION

The present invention is directed to methods and systems for converting contaminants contained in an in situ environment, that is in soil and/or groundwater to non-contaminating or harmless compounds. The methods and systems include treatment of the contaminants with a peroxide (e.g. hydrogen peroxide) and ozone which produce the hydroxyl radical and other reactive species to thereby promote and control the conversion of the contaminants to harmless by-products.

BACKGROUND OF THE INVENTION

The treatment of contaminated in situ soils and groundwater has gained increased attention over the past few years because of the increasing number of uncontrolled hazardous waste disposal sites. It is well documented that the most common means of site remediation has been excavation and landfill disposal. While these procedures remove contaminants, they are extremely costly and in some cases difficult if not impossible to perform.

More recently, research has focused on the conversion of contaminants contained in soil and groundwater based on the development of on-site and in situ treatment technologies. In situ treatment technologies are those that are performed in the natural environment of the contaminated soil/groundwater. These treatment technologies contrast with ex situ treatment technologies which remove the soil and/or groundwater from the natural environment to a controlled environment such as a treatment vessel. While ex situ systems are typically effective because a) they treat relatively small finite batches of soil and/or groundwater and b) they enable uniform distribution of contaminant treating reagents, nonetheless, such systems are disadvantageous because the contaminated environment must be transported to an offsite location at considerable expense.

One such in situ treatment has been the incineration of contaminated soils. The disadvantage of this system is in the possible formation of harmful by-products including polychlorinated dibenzo-p-dioxins (PCDD) and polychlorinated dibenzofurans (PCDF). Biological soil treatment and groundwater treatment is another such in situ system that has been reviewed in recent years. So-called bioremediation systems, however, have limited utility for treating waste components that are biorefractory or toxic to microorganisms.

Such in situ bioremediation systems were the first to investigate the practical and efficient injection of hydrogen peroxide into groundwater and/or soils. These investigations revealed that the overriding issue affecting the use of hydrogen peroxide in situ was the instability of the hydrogen peroxide downgradient from the injection point. The presence of minerals and the enzyme catalase in the subsurface catalyzed the disproportionation of hydrogen peroxide near the injection point, with rapid evolution and loss of molecular oxygen, leading to the investigation of stabilizers as well as biological nutrients.

During the early biological studies from the 1980s, some investigators recognized the potential for competing reactions, such as the direct oxidation of the substrate by hydrogen peroxide. Certain researchers also hypothesized that an unwanted in-situ Fenton's-like reaction under native conditions in the soil was reducing yields of oxygen through the production of hydroxyl radicals. Such a mechanism of contaminant reduction in situ was not unexpected, since Fenton's-type systems have been used in ex situ systems to treat soil and groundwater contamination.

Other investigators concomitantly extended the use of Fenton's-type systems to the remediation of in situ soil systems. These studies attempted to correlate variable parameters such as hydrogen peroxide, iron, phosphate, pH, and temperature with the efficiency of remediation.

As with the bioremedial systems, in situ Fenton's systems were often limited by instability of the hydrogen peroxide in situ and by the lack of spatial and temporal control in the formation of the oxidizing agent (hydroxyl radical) from the hydrogen peroxide. In particular, aggressive/violent reactions often occurred at or near the point where the source of the oxidizing agent (the hydrogen peroxide) and the metal catalyst were injected. As a consequence, a significant amount of reagents including the source of the oxidizing agent (hydrogen peroxide) was wasted because activity was confined to a very limited area around the injection point. In addition, these in situ Fenton's systems often required the aggressive adjustment of groundwater pH with acid, which is not desirable in a minimally invasive treatment system. Finally, such systems also resulted in the mineralization of the subsurface, resulting in impermeable soil and groundwater phases due to the deleterious effects of the reagents on the subsurface soils.

Other researchers such as Susan J. Masten "The Use of Ozonation to Degrade Organic Contaminants in Wastewaters" *Env. Sci. Technol.* Vol. 28, No. 4 (1994) have investigated the use of ozone, either alone or in combination with hydrogen peroxide, in ex situ advanced oxidation processes (AOPs). These systems suffered from a similar limitation as the ex situ Fenton's systems; namely, the necessity to pump contaminants from the in situ media to an external reaction vessel, a requirement which was both expensive and inefficient. Ozonation processes also suffered from low selectivity of contaminant destruction and high instability of the ozone and reactive species generated. In addition, it has been observed that from ex situ applications intermediate to high pH conditions are favored for the effective decomposition of ozone in the presence of hydrogen peroxide. These conditions can result in the acidification of the subsurface or mineralization of soils.

It would be of significant advantage in the art of removing contaminants from soil and/or groundwater to provide a system by which the source of the oxidizing agent can travel from the injection point throughout the aerial extent of the contamination in order to promote efficient destruction of the contaminant plume without the acidification of the subsurface or the resultant mineralization of the soils. It would also be a significant advantage in the art to generate a variety of reactive species in sufficient quantity to allow the efficient degradation of a number of contaminants including traditionally recalcitrant chlorinated solvents such as polychloroethylenes and trichloroethylenes.

It would be a further benefit in the art to provide a system which efficiently generates the hydroxyl radical to provide a cost efficient and effective method of oxidizing contaminants in soil and/or ground water.

SUMMARY OF THE INVENTION

The present invention is directed to methods and systems for treating contaminants in an in situ environment in which a reactive agent (hydroxyl radical and/or other reactive species) obtained from the reaction of a peroxide, such as hydrogen peroxide, with ozone, in an in situ environment reduces or eliminates contaminants present therein in a cost efficient and effective manner.

In accordance with one aspect of the invention, there is provided a method and system of treating contaminants in an in situ environment comprising adding an effective amount of a peroxide to the in situ environment together or separately with an effective amount of ozone, which by their reaction and generation of reactive species, are capable of oxidizing at least one of the contaminants to reduce the concentration thereof in the in situ environment without acidification of the environment. The present system enables temporal and spatial control of the oxidation process so that the reactive species (e.g. hydroxyl radical) is able to be generated into areas where contaminants are present. As a result, aggressive/violent reactions at the point of injection are minimized and less reactive species is wasted. In addition, due to the generation of hydroxyl radicals throughout the plume and the presence of other reactive species, contaminants normally recalcitrant to ex situ Fenton's or advance oxidation processes are now able to be converted to harmless by-products.

The amount of hydrogen peroxide and ozone delivered to the in situ environment must be controlled to avoid aggressive/violent reactions at the point of injection and to provide uniform distribution of the reactive species (i.e. hydroxyl radicals) throughout the plume. In a particular aspect of the present invention, the weight ratio of ozone to hydrogen peroxide is in the range of 0.2 to 1.5, preferably from about 0.4 to 1.2. Concentrations of hydrogen peroxide of up to 35% by weight in water, typically 3-25% by weight and 2 to 15% by volume of ozone in air, typically 3 to 12% by volume significantly exceed the amount of such reactants used in controlled ex situ systems.

In accordance with preferred aspects of the invention, the peroxide component is first injected into the in situ environment, either the groundwater or the soil above the groundwater. The gaseous ozone is preferably injected into the groundwater through multiple sparge points dispersed throughout the aerial extent of the plume where it combines with the peroxide to generate the reactive species (e.g. hydroxyl radical). Alternatively, the ozone can be injected into the subsurface as an aqueous solution into the groundwater or as a gas into the vadose zone.

In accordance with another aspect of the invention, the methods and systems herein can be applied to oxidizing contaminants in formations which are difficult to access such as fractured bedrock. In particular, the peroxide and ozone are injected at elevated pressures into the fractured bedrock to treat contaminants whose density is greater than water and are often trapped in bedrock fractures.

In a further aspect of the invention, the peroxide and ozone are injected into the in situ environment to enhance the operation and efficiency of traditional remediation technologies such as pump and treat and solvent vapor extraction systems. The present invention enhances these conventional systems that are based on mechanical removal of the contaminants. This is because the oxidation reactions which convert the contaminants to harmless compounds also enhance desorption of the contaminants from organic carbon in soil and/or groundwater and generally result in enhanced volatilization. The breakdown of contaminants into smaller compounds and the increased production of carbon dioxide in the method of the present invention also enhances volatilization and reduces adsorption of organic carbon in the soil.

DETAILED DESCRIPTION OF THE INVENTION

The present invention is directed to methods and systems for removing contaminants from soil and/or groundwater by converting the same to harmless by-products. Such contaminants typically arise from petroleum storage tank spills or from intentional or accidental discharge of liquid hydrocarbons or compositions containing the same. Typical examples of contaminants are hydrocarbons including, but not limited to: gasoline, fuel oils, benzene, toluene, ethylbenzene, xylenes, naphthalene, pesticides, herbicides and other organic compounds; lubricants; chlorinated solvents, including polychlorinated ethylenes, trichlorinated ethylenes, vinyl chlorides, dichloro ethylenes, polychlorinated biphenyls (PCBs), pentachlorophenol (PCP); and metals, cyanides and the like. The list of contaminants provided herein is exemplary. It should be understood, however, that other contaminants capable of being oxidized into harmless compounds, such as carbon dioxide and water, is within the purview of the present invention.

In accordance with the present invention, the methods and systems for remediation of a contaminated environment in situ is performed by providing a stabilized source of a peroxide, for example hydrogen peroxide, and a source of ozone in effective amounts so that they may react in situ to form a reactive species (e.g. hydroxyl radical), as hereinafter described. It has been found that the reactive species generated in this way are found throughout the extent of the plume with a resultant higher efficiency of contaminant destruction without acidification of soil and resultant mineralization which would occur using peroxide/ozone systems especially adapted for ex situ treatment technologies.

In one embodiment of the invention, the peroxide and the ozone are alternately injected (i.e. pulsed) into the soil and/or groundwater. In another embodiment of the invention, the stabilized peroxide is allowed to disperse or migrate throughout the plume and subsequently the ozone is bubbled into the groundwater through, preferably, multiple sparge points.

The sources of the reactive species employed in the present invention is the combination of a peroxide and ozone. Peroxides include, for example, hydrogen peroxide, calcium peroxide, and sodium peroxide. Calcium peroxide is very slightly soluble in water and is generally more expensive than hydrogen peroxide. However, calcium peroxide can be used as an effective source of oxidizing agent for hydrocarbon-contaminated sites. Sodium peroxide has been found to behave in a manner similar to calcium peroxide and can be used as well. Hydrogen peroxide is the preferred peroxide for use in the present invention.

The peroxide (e.g. hydrogen peroxide) reacts with ozone in situ to produce reactive species, including but not limited to hydroxyl radicals, hydroperoxide ion, and ozonide ion. Ozone has previously been used as a disinfectant and in more recent applications to oxidize refractory organic contaminants. The effective concentration of ozone suitable for employment in the present invention can be supplied from known commercial ozone generators (e.g. from about 3 to 15% ozone in air).

What is essential is that the system be capable of generating reactive species in sufficient quantity and for a sufficient length of time to convert existing contaminants (e.g. hydrocarbons) to harmless compounds (e.g. carbon dioxide and water vapor).

Prior to injection, the peroxide is preferably stabilized. Stabilization prevents the immediate conversion of the peroxide via native iron or catalase into hydroxide radicals or oxygen at positions only immediately adjacent to the injection points. Once stabilized the peroxide is introduced into the in situ environment, typically in water at a concentration of up to about 35% by weight in water, preferably from about 3 to 25% by weight. It will be understood that the concentration of peroxide in the in situ environment will significantly decrease as the peroxide spreads out through the soil and/or groundwater. Suitable stabilizers include acids and salts thereof. The most preferred acid is phosphoric acid and the most preferred salt is monopotassium phosphate.

The in situ environment for most soil and/or groundwater sites includes a water table which is the uppermost level of the below-ground, geological formation that is saturated with water. Water pressure in the pores of the soil or rock is equal to atmospheric pressure. Above the water table is the unsaturated zone or vadose region comprising the upper layers of soil in which pore spaces or rock are filled with air or water at less than atmospheric pressure. The capillary fringe is that portion of the vadose region which lies just above the water table.

The capillary fringe is formed by contact between the water table and the dry porous material constituting the vadose region. The water from the water table rises into the dry porous material due to surface tension because of an unbalanced molecular attraction of the water at the boundary.

The source of the reactive species (peroxide and ozone) can be administered in any zone in the in situ environment by any method considered conventional in the art. For example, administration can be directly into the groundwater through a horizontal or vertical well or into subterranean soil through a well or infiltration trenches at or near the site of contamination. In a preferred form of the invention, the peroxide is placed into the subsoil where it leaches therethrough into the groundwater. Ozone can be introduced directly to the groundwater as a gas or as an aqueous solution (preferably through multiple sparge points) or may be injected into the vadose zone.

As previously indicated, peroxide and ozone can be administered under elevated pressures into hard to reach places such as fractures within underlying bedrock. These fractures are collecting places for contaminants which are typically more dense than water. When administered the peroxide and ozone are able to penetrate the fractures, contact the contaminants and convert the same to harmless compounds.

Injection of the peroxide and ozone can be accomplished by installing steel or polyvinylchloride lined wells or open hole type wells into the bedrock. Packers and bladders conventionally employed in downhole drilling can be employed to assist in isolating discrete fractures and accessing the contaminants with the reagents. The reagents are then injected into the fractures at applied elevated pressures, typically in the range of from about 40 to 100 psi.

The administration of the peroxide and ozone into the in situ environment including bedrock fractures under elevated pressures can be accomplished either alone or in conjunction with conventional treatment systems. Such systems include pump and treat systems which pump the contaminated groundwater out of the in situ environment and solvent vapor extraction systems in which a vacuum is applied to the site of contamination to physically enhance volatilization and desorption of the contaminants from soil and/or groundwater.

The employment of ozone as a reactant for the formation of reactive species is advantageous because ozone can be continuously generated by readily available ozone generators which do not require excessive labor to operate. In addition, unlike conventional Fenton's systems which are highly dependent on pH and require the aggressive adjustment of site pH, it has been found that the present system functions efficiently at neutral to alkaline pH, consistent with the native pH found in many subsurface environments. The present system therefore prevents acidification of the soil.

As indicated above, the peroxide and ozone can be administered directly into the in situ environment. In a preferred form of the invention, the amount of the peroxide and ozone and the number of treatment cycles are predetermined. For example, samples of the contaminated soil and/or groundwater are taken and the concentrations of the peroxide and ozone required for in situ treatment are then determined based on the amount of each reagent needed to at least substantially rid the samples of the contaminants contained therein.

More specifically, a sample of the soil and/or groundwater is analyzed to determine the concentration of the contaminants of interest (e.g. hydrocarbons). Analysis of volatile hydrocarbons can be made by gas chromatographic/mass spectrometric systems which follow, for example, EPA Method 624. Semi-volatiles are analyzed in a similar manner according to, for example, EPA Method 625.

Results from these analyses are used to determine the combinations of peroxide and ozone for treatment of the sample based on the type and concentration of the contaminants. A specific weight ratio of the peroxide and ozone is used for the sample based on prior research, comparative samples and the like. Typical sample volumes can be in the range of from about 120 to 150 ml. It has been found that a weight ratio of from about 0.2 to 1.5 w/w peroxide/ozone in the in situ environment is desirable because operation within this ratio provides the highest efficiency of contaminant destruction for most contaminants.

Sample analysis is also employed to determine the number of treatment cycles which may be necessary to achieve the desired reduction in the level of contaminants. While one treatment cycle may be used, it is often desirable to employ a plurality of treatment cycles depending on the type and concentration of contaminants. The number of treatment cycles is determined in part by monitoring the performance of the peroxide and ozone once injected into the soil and/or groundwater.

In operation, the peroxide and ozone are injected into sealed vials with a syringe. The doses of peroxide and ozone are given as hourly treatment cycles with the expectation that the samples will typically require as few as one treatment cycle and as many as five treatment cycles in order to substantially or completely convert the contaminants to harmless by-products.

A control sample is set up for each type of sample undergoing the study to correct for any volatization loss. All experimental vials are allowed to sit overnight at room temperature. On the following day the samples are analyzed to determine the concentration of contaminants by the above-mentioned EPA procedures. Once the results are obtained, they may be extrapolated to provide a suitable amount of the peroxide and ozone necessary to treat the contaminants in situ.

Injection of the stabilized source of the peroxide may be performed under both applied and hydrostatic pressure into the in situ environment. Flow rates will vary depending on the subsurface soil characteristics with faster rates associated with more highly permeable soils (e.g. gravel and/or sand). Slower rates as low as 0.1 gallons per minute may be used for less permeable soils (e.g. clays and/or silts). The stabilized source of the peroxide may be injected into the subsurface and allowed to disperse over a specific period, typically about 24 hours. The length of time may be varied depending on the soil type.

In less permeable soils, injection procedures are preferably associated with a pressurized system. A typical system involves injection wells installed with screens set at specific levels to allow for higher pressures and countered by pumping into less permeable soils. The pumping system can include a low horsepower pump at pressures ranging from between about 10 and 40 pounds per square inch. The stabilized peroxide may be pumped in short pulse injections or in a long steady flow as desired.

In a preferred form of the invention, the stabilized peroxide is injected directly into the capillary fringe, located just above the water table. This can be accomplished in a conventional manner by installing a well screened in the capillary fringe and injecting the reagents into the well screen.

After the peroxide has been injected into the in situ environment and allowed to disperse throughout the aerial extent of the plume in this preferred embodiment, ozone is generated on site and pumped into the subsurface as described previously. Preferably the ozone is injected as a gas into the groundwater through multiple injection points arranged throughout the aerial extent of the plume. In another embodiment, the ozone and peroxide can be alternatively pulsed into the in situ environment.

In particular, the effects of naturally occurring minerals including their reactivity with the peroxide and ozone can have a dramatic effect on the extent of the formation of the reactive species. It has been found that injection of the stabilized source of the peroxide followed by subsequent repeated ozone injections allows for improved efficiency of conversion to reactive species throughout the plume in the subsurface.

In particular, a monitoring system employs a free radical trap to directly measure the concentration of the reactive species contained within the in situ environment. More specifically, a sample of the soil and/or groundwater is combined with a specified amount of a free radical trap such as methylene blue dye. The mixture is stabilized and precipitated and/or colloidal matter removed. The absorbance of the color remaining in the sample is measured using a spectrophotometer at a wavelength capable of measuring the absorbance of the blue dye (e.g. 662 nm). The absorbance value is then compared to the standard curve of absorbance vs. reagent value determined for the particular site.

The free radical concentration of the sample is expressed as a reagent value (R) which is proportional to the concentration of the radical and is representative of the amount of the peroxide and ozone initially added that are remaining at that point as shown in Table #1. This amount is expressed as a fraction proportional to the total number of treatment cycles X, wherein X is the number of treatment cycles originally recommended for the sample.

TABLE 1

| Reagent Value (R) | Explanation |
| --- | --- |
| 2 | 100% of the peroxide and ozone initially added are still present. The amount of free radicals produced in 10 minutes is highest for this sample. |
| 1 | 50% of the peroxide and ozone initially added are still remaining in the sample. The amount of free radicals produced in 10 minutes for R = 1 sample is one half the amount produced for R = 2 sample. |
| 0.5 | 25% of the peroxide and ozone initially added are still remaining in the sample. The amount of free radicals produced in 10 minutes for R = 0.5 sample is one quarter the amount produced for R = 2 sample. |

EXAMPLE 1

The following experiments were conducted in two (2)—1500 cm$^3$ air-tight glass reactors with inlets provided for ozone, hydrogen peroxide, sample collection and venting. A representative contaminated sample as shown in Table 2 was prepared by spiking appropriate concentrations of the contaminants into tap water. Exactly 1000 cm$^3$ of the substrate solution was decanted into each of two reactors designated for control and treatment purposes and placed on magnetic stirrers for a mixing operation. The Ozonator used in the experiments had a maximum ozone generating capacity of 6 g/h. Hydrogen peroxide was introduced into the treatment reactor immediately prior to ozonation. Ozonated oxygen (approx. 4% v/v O$_3$) was introduced and allowed to bubble at the bottom of the reactor.

The control reactor was simultaneously treated by introducing distilled water in place of hydrogen peroxide and bubbled with pure oxygen instead of ozone at similar flow rates. Water samples were withdrawn periodically for residual hydrogen peroxide analysis. Water and air samples for volatile organic analysis were collected after 60 minutes of ozonation at which time hydrogen peroxide was completely consumed.

Air samples were collected in tedlar bags and water samples in 40 ml VOA vials preserved in HCl. Both air and water samples were analyzed for targeted volatile organics by an EPA certified laboratory. Hydrogen peroxide concentration was determined by complexing with Ti(IV) and measuring the absorbance of the yellow color developed spectrophotometrically (FMC 1989). Ozone concentration in both air and water was measured by iodometric titration (Standard Methods, 1989). The results are shown in Table 2.

TABLE 2

| Contaminant | Before Treatment (ppb)* | After Treatment (ppb)* | Percent Reduction (%) |
| --- | --- | --- | --- |
| Trichloroethene | 518 | 7.1 | 98.6 |
| Perchloroethene | 472 | 11.3 | 97.6 |
| Vinyl Chloride | 610 | 9.0 | 98.5 |
| cis-1,2-Dichloroethene | 450 | 5.0 | 98.9 |
| Benzene | 87 | 3.5 | 95.9 |
| Toluene | 112 | ND** | 100.0 |

*parts per billion
**Not Detected

As shown in Table 2, the reduction in the level of contaminants after treatment with the reactive species formed by the reaction solution containing the peroxide and ozone was between about 95.9 and 100%.

The invention claimed is:

1. A method of treating contaminants in a soil-containing in situ environment comprising: generating a stabilized source of peroxide in an effective amount of up to 35% by weight in water, administering the stabilized source of peroxide to at least a portion of the in situ environment, administering ozone to said at least a portion of the in situ environment thereafter in an effective amount of 2 to 15% by volume in air under spatial and temporal control conditions to form a reactive species principally in the form of hydroxyl radicals to oxidize at least one of the contaminants without acidification of the environment and without aggressive reactions between the stabilized source of peroxide and the ozone at the point of administration.

2. The method of claim 1 wherein the stabilized source of the peroxide is selected from the group consisting of hydrogen peroxide, sodium peroxide and calcium peroxide.

3. The method of claim 2 wherein the stabilized source of the peroxide is hydrogen peroxide.

4. The method of claim 1 comprising forming the stabilized source of the peroxide by combining a source of peroxide with a stabilizer selected from the group consisting of acids, salts and mixtures thereof.

5. The method of claim 4 wherein the stabilizer is selected from the group consisting of phosphoric acid, monopotassium phosphate and combinations thereof.

6. The method of claim 1 further comprising monitoring the concentration of the reactive species in the in situ environment.

7. The method of claim 1 wherein the in situ environment contains fractured bedrock.

8. The method of claim 1 comprising adding the stabilized source of the peroxide and ozone at an elevated pressure.

9. The method of claim 8 wherein the elevated pressure is from about 40 to 100 psi.

10. The method of claim 8 wherein the in situ environment is fractured bedrock.

11. The method of claim 1 wherein the concentration of the stabilized peroxide is from about 3 to 25% by weight in water.

12. The method of claim 1 wherein the weight ratio of peroxide to ozone is in the range of from about 0.4 to 1.2 w/w.

13. The method of claim 1 wherein the amount of ozone in air is from about 3 to 12% by volume.

14. The method of claim 1 comprising injecting the ozone through a plurality of injection points in the in situ environment.

15. The method of claim 1 comprising allowing the stabilized source of peroxide to migrate through the in situ environment and then adding the ozone to the in situ environment.

16. The method of claim 15 comprising adding the ozone at multiple points to the in situ environment.

17. The method of claim 1 further comprising predetermining at least one of the concentration of the stabilized source of peroxide, the concentration of ozone and an effective member of treatment cycles necessary to effectively treat the contaminants in the in situ environment.

18. The method of claim 17 wherein the predetermining step comprises removing at least one sample of the in situ environment and treating the sample with the concentration of the stabilized source of peroxide, the concentration of ozone and a number of treatment cycles sufficient to treat the contaminants contained in the sample, and applying such concentrations and treatment cycles to the contaminants contained in the in situ environment.

* * * * *